(12) United States Patent
Taillon et al.

(10) Patent No.: US 7,895,716 B2
(45) Date of Patent: Mar. 1, 2011

(54) ADJUSTABLE SPIRAL SLEEVE FOR PROTECTING LINES

(75) Inventors: Michel Taillon, Saint-Prime (CA); Jeremy Lawson, Montreal (CA)

(73) Assignee: Taimi R&D Inc., QC (CA)

( * ) Notice: Subject to any disclaimer, the term of this patent is extended or adjusted under 35 U.S.C. 154(b) by 993 days.

(21) Appl. No.: 11/723,950

(22) Filed: Mar. 22, 2007

(65) Prior Publication Data

US 2007/0228226 A1    Oct. 4, 2007

Related U.S. Application Data

(60) Provisional application No. 60/784,458, filed on Mar. 22, 2006.

(51) Int. Cl.
  *F16L 3/12* (2006.01)
  *F16L 3/14* (2006.01)
  *B29C 53/78* (2006.01)

(52) U.S. Cl. .................. 24/16 R; 24/115 R; 174/72 A; 174/135; 248/60; 248/74.3

(58) Field of Classification Search ............... 248/74.3, 248/60; 24/298, 302, 68.1, 74.3, 16 R, 115 N, 24/714.6, 115 R; 174/135; 439/359, 362, 439/371
See application file for complete search history.

(56) References Cited

U.S. PATENT DOCUMENTS

| | | | |
|---|---|---|---|
| 1,466,078 A * | 8/1923 | Washburn | 24/713.4 |
| 1,538,454 A * | 5/1925 | Trawinski | 24/714.6 |
| 2,684,512 A * | 7/1954 | Beman | 174/72 A |
| 3,601,863 A | 8/1971 | Dorsey | |
| 3,616,123 A | 10/1971 | Reynolds, Jr. et al. | |
| 4,788,089 A | 11/1988 | Skipper | |
| 4,893,381 A | 1/1990 | Frankel | |
| 4,920,235 A | 4/1990 | Yamaguchi | |
| 4,929,478 A | 5/1990 | Conaghan et al. | |
| 5,075,934 A | 12/1991 | Osedo | |
| 5,111,554 A * | 5/1992 | Sweers | 24/16 R |
| 5,384,430 A | 1/1995 | Anthony et al. | |
| 5,524,327 A | 6/1996 | Mickel et al. | |
| 5,528,824 A | 6/1996 | Anthony et al. | |
| 5,632,071 A * | 5/1997 | Maunder | 24/580.1 |
| 6,051,291 A | 4/2000 | Gladfelter et al. | |
| 6,309,721 B1 | 10/2001 | Gladfelter et al. | |
| 6,635,825 B2 | 10/2003 | Adachi | |
| 6,842,948 B2 | 1/2005 | Smith | |
| 6,878,873 B2 | 4/2005 | Fryberger, Jr. et al. | |

(Continued)

FOREIGN PATENT DOCUMENTS

CA    2 135 380    11/1994

*Primary Examiner*—Robert J Sandy
(74) *Attorney, Agent, or Firm*—Jacobson Holman PLLC (57) ABSTRACT

An adjustable spiral sleeve for wrapping around lines for protecting and regrouping the lines includes a support strip for extending longitudinally alongside the lines, the support strip including a plurality of connectors longitudinally distributed and spaced-apart therealong. The sleeve also includes a wrapping strip spirally wrappable around the lines and connectable to the connectors of the support strip at adjustable positions along the wrapping strip to form a plurality of adjustably-sized loop portions of the wrapping strip around the lines. The sleeve enables adjustable fitting around lines. The adjustable spiral sleeve is especially useful in protecting hydraulic lines in dynamic machinery such as that used in the forestry industry and/or mining industry.

28 Claims, 7 Drawing Sheets

U.S. PATENT DOCUMENTS

| | | |
|---|---|---|
| 7,185,399 B2 | 3/2007 | Logan |
| 2002/0098311 A1 | 7/2002 | Lindner |
| 2002/0190451 A1 | 12/2002 | Sancaktar et al. |
| 2003/0079790 A1 | 5/2003 | Atkinson et al. |
| 2003/0097735 A1 | 5/2003 | Shore |
| 2004/0040125 A1 | 3/2004 | Schultz |

* cited by examiner

FIG. 1

(PRIOR ART)

ADJUSTABLE SPIRAL SLEEVE FOR PROTECTING LINES

This is a complete application claiming benefit of provisional 60/784,458 filed Mar. 22, 2006.

FIELD OF THE INVENTION

The present invention relates to numerous industrial fields in which lines—such as hoses, cables, tubes or pipes—are regrouped, covered and/or protected. More particularly, the invention pertains to spiral sleeves for covering at least one flexible line, and methods for installing the same.

BACKGROUND OF THE INVENTION

In many industries, particularly those involving heavy machinery, a variety of hoses, tubes, cables and pipes, which can generally be termed "lines", are used for a variety of purposes. For instance, flexible lines, which generally include hoses, tubes or cables, may be used for transporting fluids or electricity. Flexible lines may also be used for hanging or supporting parts of a machine. For example, the forestry industry uses heavy machinery that requires hoses that contain hydraulic fluid for mechanically powering the machines, and electrical cables for electrically powering the machines. Other industries—such as plumbing, petrochemical, chemical, automotive, robotics, etc.—require flexible lines for transporting electricity or gas or liquid fluids.

Industrial environments can be gruelling, extreme and harsh. Not only does the industrial equipment include heavy, dynamic parts, but the surroundings of many industrial applications are rife with potentially destructive dangers. The weight, speed and chemical elements involved on many industrial sites give rise to hazards relating to equipment breakdown. In the forestry industry, for instance, the climate, the terrain and the closed-in areas impose difficult constraints on the cutting and removal of lumber.

The forestry environment thus requires equipment with high sophistication in order to efficiently perform a number of industrial operations. Productivity and operation costs are omnipresent issues and manufacturers are constantly motivated to develop products with higher performance and new innovation.

As an example in the forestry industry, the technology of feller-buncher machines provided with lateral inclination systems have been developed and enable considerable improvements relating to the amplitude of movements of cutting equipment. The feller-buncher heads (often called "harvesters") enable a variety of impressive movements. These are just a few examples of equipment in the forestry industry that enable a better positioning and orientation about the trees that are either standing or have been cut, in order to reduce the circulation of the larger equipment within the cramped environment of the forest.

Flexible lines are constantly called upon in industry and are very important in the operation of large equipment and especially of equipment that is provided with a greater degree of dexterity. The demands on such flexible lines are growing, as is the need to prolong their working life. In fact, the working life of flexible lines is omnipresent for many industries and manufacturers. The maintenance required for tightening and replacing couplings and flexible lines is part of the daily grind of industries including that of forestry.

The prior art describes protective sleeves or reinforcements for covering, supporting and protecting single or clusters of flexible lines. A variety of such protective sleeves that wrap or shield a cluster of hoses, tubes or cables are available. More particularly, as will be discussed herebelow, 1) plastic spiral sleeves and 2) tubular sleeves are products that have been commercialized in order to regroup, envelop and protect flexible hydraulic lines. Another technique, called the 3) chain and bracelet technique, is also known in the art.

1) Plastic Spiral Sleeves

It has been found in the prior art that flexible hydraulic tubes can be grouped in a cluster and protected using a plastic spiral sleeve. For instance, feller-buncher machines may include clusters of flexible lines protected by plastic spiral sleeves.

Figure 1:
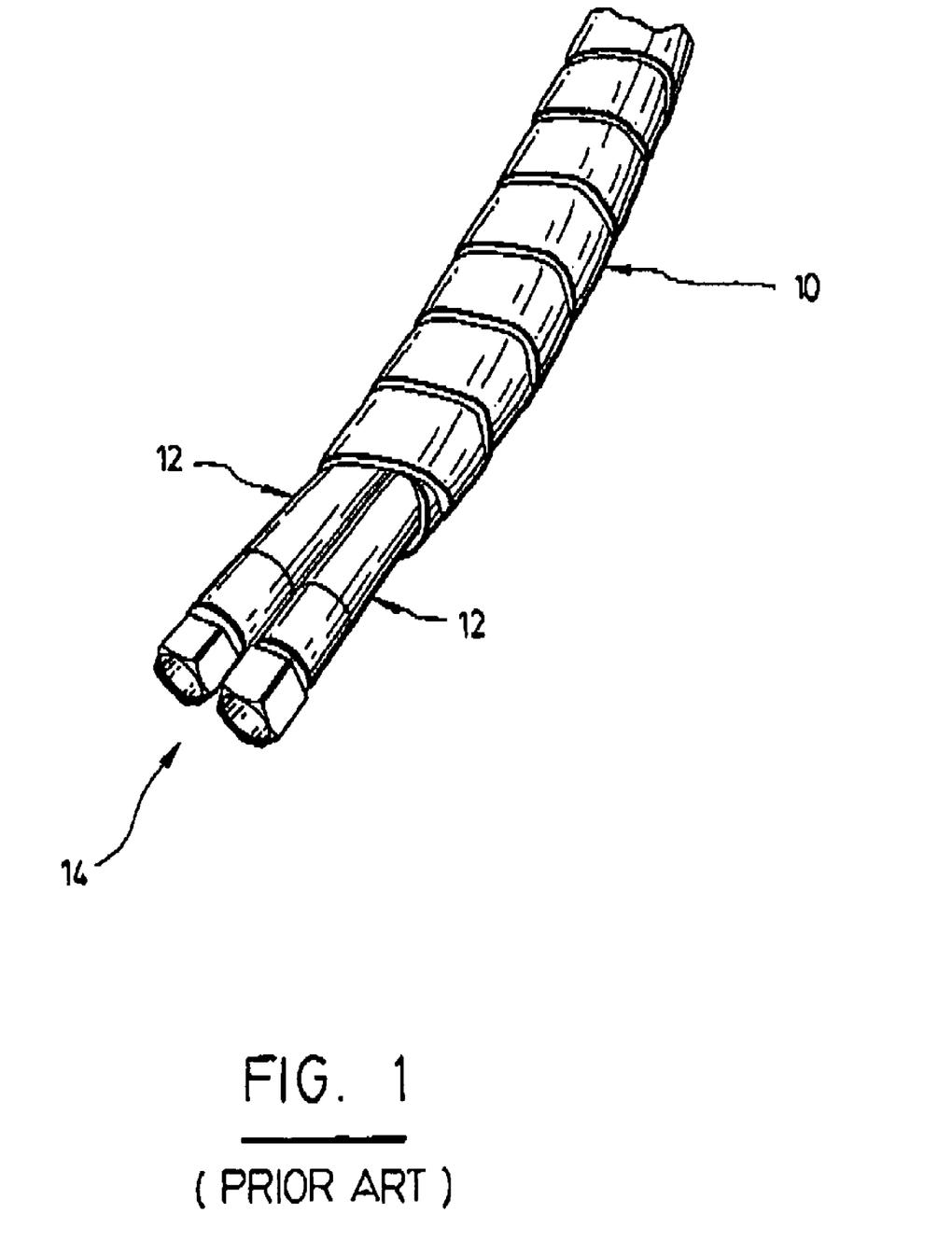
FIG. 1 (PRIOR ART) is perspective view of a cluster of hydraulic lines regrouped and protected by a plastic spiral sleeve.

FIG. 1 (PRIOR ART) shows a spiral sleeve (10) known in the prior are. Here, lines (12) are grouped into a line cluster (14), which is wrapped and protected by the plastic spiral sleeve (10). The lines (12) have not been installed in this illustration. This kind of sleeve is without question the most used product on the market. Such sleeves may be installed before or after installation of the hydraulic lines. Regrouping the lines can also be done in a manner to enable visibility for inspecting leaks in the lines. These plastic sleeves also give an aesthetic value to a cluster of hydraulic tubes, at least when originally installed.

The sleeve (10) defines a single spiralable band that wraps around the line or cluster of lines to offer protection. Plastic spiral sleeves are most commonly made of thermoplastic materials. Commercialized sleeves of this type include KOVERTEC™.

Such plastic spiral sleeves (10) installed on lines and line clusters may become unravelled, shifted and worn.

These plastic spiral sleeves suffer from a number of difficulties, problems and disadvantages, among which are the following:

Rigidity and difficulty of assemblage: The plastic material often presents properties causing it to become hard at low temperatures. For some applications at very low temperatures, the glass transition temperature of the plastic is too high to permit the sleeve to maintain the required flexibility. Assembling the single spirable band frequently presents difficulties.

Sensitive to temperature variation: Variations in temperature may cause the sleeve to rigidify or even, at extreme temperatures, rupture.

A low resistance to stretching: Thermoplastics may be stretched when a sufficient force is exerted on them. Stretching may lead to equipment damage, especially damage to the flexible lines covered by the plastic sleeve.

Permanent deformation: When a thermoplastic undergoes stretching past a certain point, it becomes permanently deformed and cannot regain its previous form. This is problematic when a tight fit to the lines is desired.

Absence of protection on the entire length of the tubes: It is difficult to wrap the plastic sleeves around the entire length of the line cluster, particularly since the extremities of a line cluster tend to expand radially. The plastic sleeves suffer from sliding and an inability to stay at the extremities of the flexible lines. Thus, the extremities of the line cluster are often exposed and left unprotected.

Wearing of the lines due to the incomplete protection provided by the plastic sleeves: The thermoplastic band that makes up the protective sleeve may easily come unravelled or be shifted at the ends or at various points along the cluster of flexible lines, which may cause wearing of the lines. It is difficult to ensure that the sleeves do not shift, etc.

Limited protection against the tubes catching on something and pulling apart: When the line cluster snags on a piece of equipment or another object, this plastic sleeve offers very limited resistance to protect the lines themselves from pulling apart, snapping off or being otherwise damaged.

Needs many dimensions in order to adapt to the needs of the market: The single band that makes up the plastic spiral sleeve has limited applicability in wrapping a variety of lines and line clusters, which may present different diameters, lengths, number of lines and combinations thereof. Also, depending on the conditions (temperature, corrosion, pressure, abrasion resistance, strength, etc.) different designs of plastic sleeves may be called for.

2) Open or Closed Tubular Protective Sleeves

Tubular protective sleeves are used almost exclusively for protecting individual tubes.

Tubular sleeves are often made of thermoplastic material. A line would be inserted into a tubular sleeve prior to its installation in the particular machine. For example, a hydraulic line would be inserted into the tubular sleeve and then be connected to a hydraulic system.

There are also removable tubular sleeves provided with Velcro. These sleeves may be manufactured with thermoplastic or a textile, and are more apt at covering a plurality of lines in a cluster. Brands of these tubular sleeves include TEXWRAP™ and TEXSLEEVE™. Tubular sleeves provided with Velcro offer limited usefulness in the forestry industry and other heavy industries involving large, dynamic equipment because they are too fragile, tending to come undone when machines are operating. They also detach and open easily and do not offer the desired support or protection.

Another kind of tubular sleeve is provided with an accordion type configuration. This sleeve suffers from a variety of disadvantages that would be known to a person skilled in the art.

Other tubular sleeves have also been proposed but their intrinsic value has been said to be inferior to that of the spiral protector 1) discussed hereinabove.

3) Chain and Bracelet

Chain and bracelet protectors for regrouping flexible lines are not commercialized by manufacturers. These devices are used by certain dissatisfied technicians who do not wish to use the products currently on the market. In the forestry industry for instance, a lumber cutting machine may be provided with a cluster of lines which are grouped together by a chain and bracelet system. Numerous bracelets are looped around the cluster at various points along its length and the chain is secured to each bracelet loop at to the arm or boom of the lumber cutting device to regroup and hold the line cluster in a more or less secured position. Chain and bracelet products for protecting hydraulic lines are almost non existent but certain users rely on this method for certain applications when there is a greater risk of the flexible lines being pulled or stretched. The chain and bracelet arrangement enables the lines to be grouped together and also provides a certain resistance to stretching and pulling. However, this technique is plagued with numerous disadvantages. For example, it is difficult for the chain to follow the curvatures of the line cluster, unless the bracelets are used in great number and tightly linking the chain to the cluster. Also, the metal chain may wear the lines. The weight of the chain and bracelet device may also be so elevated as to surpass the total weight of the cluster of lines, which is problematic. Furthermore, much of the lines are exposed to the environment and thus left unprotected. Another disadvantage is due to the presence of metallic components that cause wearing of the lines, particularly when the metallic chain contacts the lines transversely. Both mechanical and aesthetic aspects of the chain and bracelet technique present a multitude of disadvantages that give rise to a need for developing a new product that would overcome some of these disadvantages.

Other Sleeves and Fastening Devices

Also found in the art is a spiral sleeve tape known as SHILTAPE™, which is manufactured with knitted fibreglass coated with resistant silicone rubber. This sleeve is made up of a single band with an adhesive side, the band being spirally wrapped around a hose to cover and protect it.

Furthermore, U.S. patent application Ser. No. 10/149,462 (ATKINSON et al.) having the publication No. 2003/0079790 A1, describes a flexible protective sleeve covering one or more lines. This sleeve includes a supporting layer formed from a strip which is wrapped like a helix around the line while having gaps between each successive helical loop. The sleeve also includes a bridging layer which covers the helical layer and "bridges" the gaps. The bridging layer is composed of a flexible material which is secured to the helical layer, for example by adhesive (paragraph [0028]) to allow the bridged gap to accommodate deformations of the sleeve.

In addition, the patent literature contains a variety of protective and/or adjustable sleeves and regrouping bands, for instance U.S. Pat. Nos. 3,601,863, 3,616,123, 4,788,089, 4,893,381, 4,920,235, 4,929,478, 5,075,934, 5,524,327, 6,051,291, 6,309,721, 6,635,825, 6,842,948 and 6,878,873, as well as U.S. patent application Ser. Nos. 09/388,752, 09/871,755, 10/258,576, 10/465,162, 10/749,430 and 10/635,671.

It may be said that the problems and disadvantages of the prior art of protective sleeves and installation methods thereof are well known in the art and there is a need for a product and method that overcome at least some of these problems and disadvantages.

SUMMARY OF THE INVENTION

The present invention responds to the above mentioned need by proposing an adjustable spiral sleeve that overcomes at least some of the disadvantages of the prior art.

Accordingly, the present invention proposes an adjustable spiral sleeve for wrapping around at least one line. The sleeve includes a support strip for extending longitudinally alongside the at least one line. The support strip includes a plurality of connectors longitudinally distributed and spaced-apart therealong. The sleeve also includes a wrapping strip spirally wrappable around the at least one line and connectable to the connectors of the support strip at adjustable positions along the wrapping strip to form a plurality of adjustably-sized loop portions of the wrapping strip around the at least one line.

Preferably, the connectors are openings and the wrapping strip is insertable through the openings.

In a first preferred embodiment of the present invention, the support strip includes a pair of superimposed layers which are attached to each other at a plurality of longitudinally distributed and spaced-apart attachment points, each opening being defined between the pair of superimposed layers and between two adjacent attachment points.

In a second preferred embodiment of the present invention, the support strip comprises three superimposed layers. A first and a second one of said layers is attached to each other by a first set of longitudinally distributed spaced-apart attachment points, and a third one of said layers is attached to one of the first and second layers at a second set of attachment points longitudinally offset from the attachment points of the first set, to defined two rows of offset openings.

The present invention also proposes for installing an adjustable spiral sleeve around at least one line. The method of wrapping the at least one line includes the steps of:
- a) placing a support strip longitudinally alongside the at least one line, said support strip comprising connectors being longitudinally distributed and spaced-apart therealong; and
- b) spirally wrapping a wrapping strip around the at least one line and connecting said wrapping strip to the connectors of the support strip to form a plurality of adjustably-sized loop portions of the wrapping strips around the at least one line.

DESCRIPTION OF PREFERRED EMBODIMENTS

The adjustable spiral sleeve according to the present invention, as well as the method of installing the same, may be used in a variety of industrial applications including but not limited to the forestry, mining, transportation, automotive, robotics, chemical, electricity, plumbing and sewage industries. The sleeve may be used to cover, protect and/or regroup various types of hoses, tubes, cables and pipes, which are employed for a variety of purposes.

The Adjustable Spiral Sleeve

FIGS. 2-6 shows the adjustable spiral sleeve (20) according to one embodiment of the present invention, which is used for covering at least one line. Of course, the adjustable sleeve (20) may be used in association with one or a plurality of lines of many sorts. Preferably, the adjustable spiral sleeve (20) is used to cover and regroup a plurality of lines. It should be understood that the term "lines" refers to hoses, tubes, pipes, cables, wires, channels or arteries of a variety of shapes and sizes. Preferably, the adjustable spiral sleeve (20) is used to cover and protect flexible lines such as hydraulic tubes or electric power cables, but other types of lines may also be covered, regrouped and/or protected using the adjustable sleeve (20). A single line may be wrapped in the adjustable sleeve (20), but preferably a plurality of lines may be regrouped into a cluster and wrapped in the adjustable sleeve (20).

Figure 2:
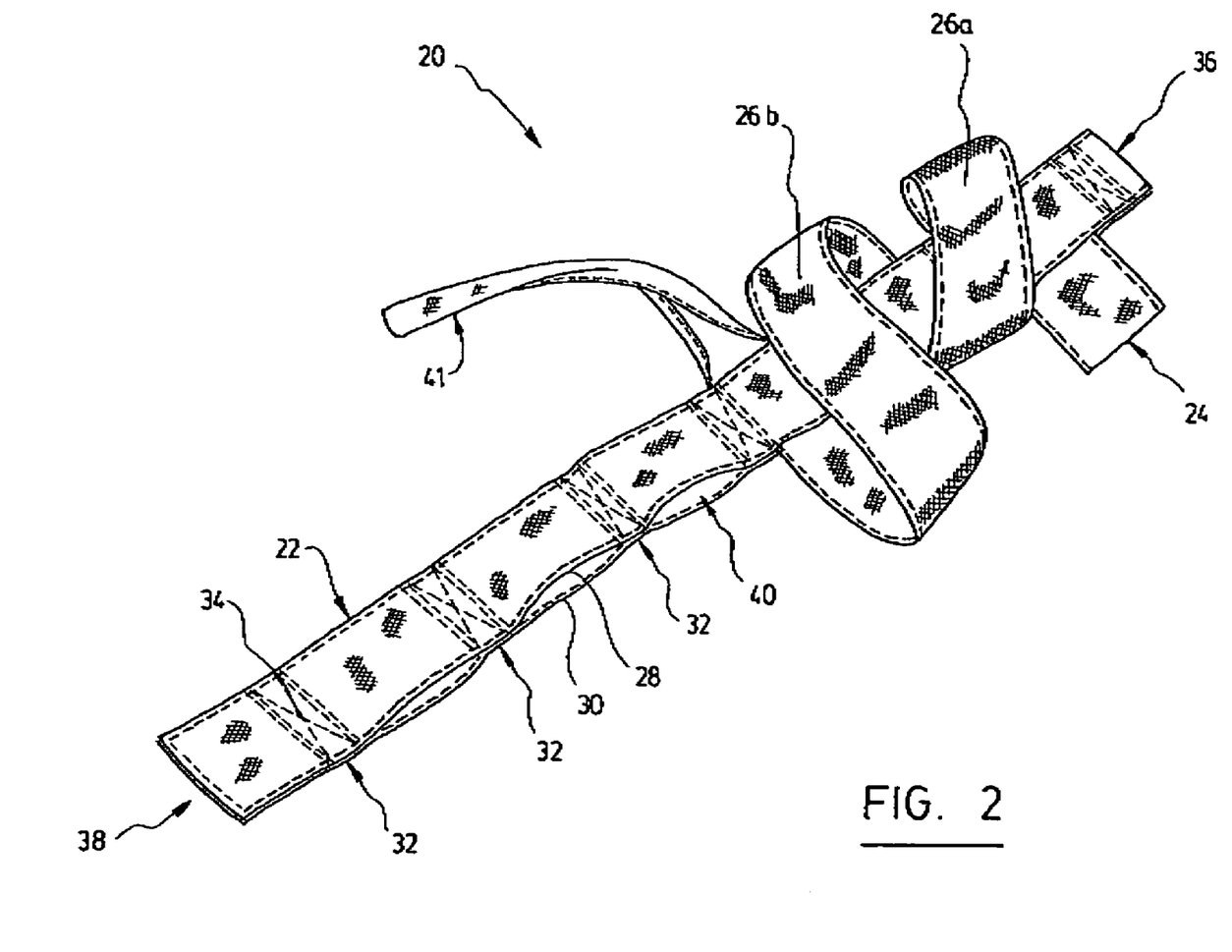
FIG. 2 is a perspective view of the partially unwound adjustable spiral sleeve according to a preferred embodiment of the present invention.
Figure 3:
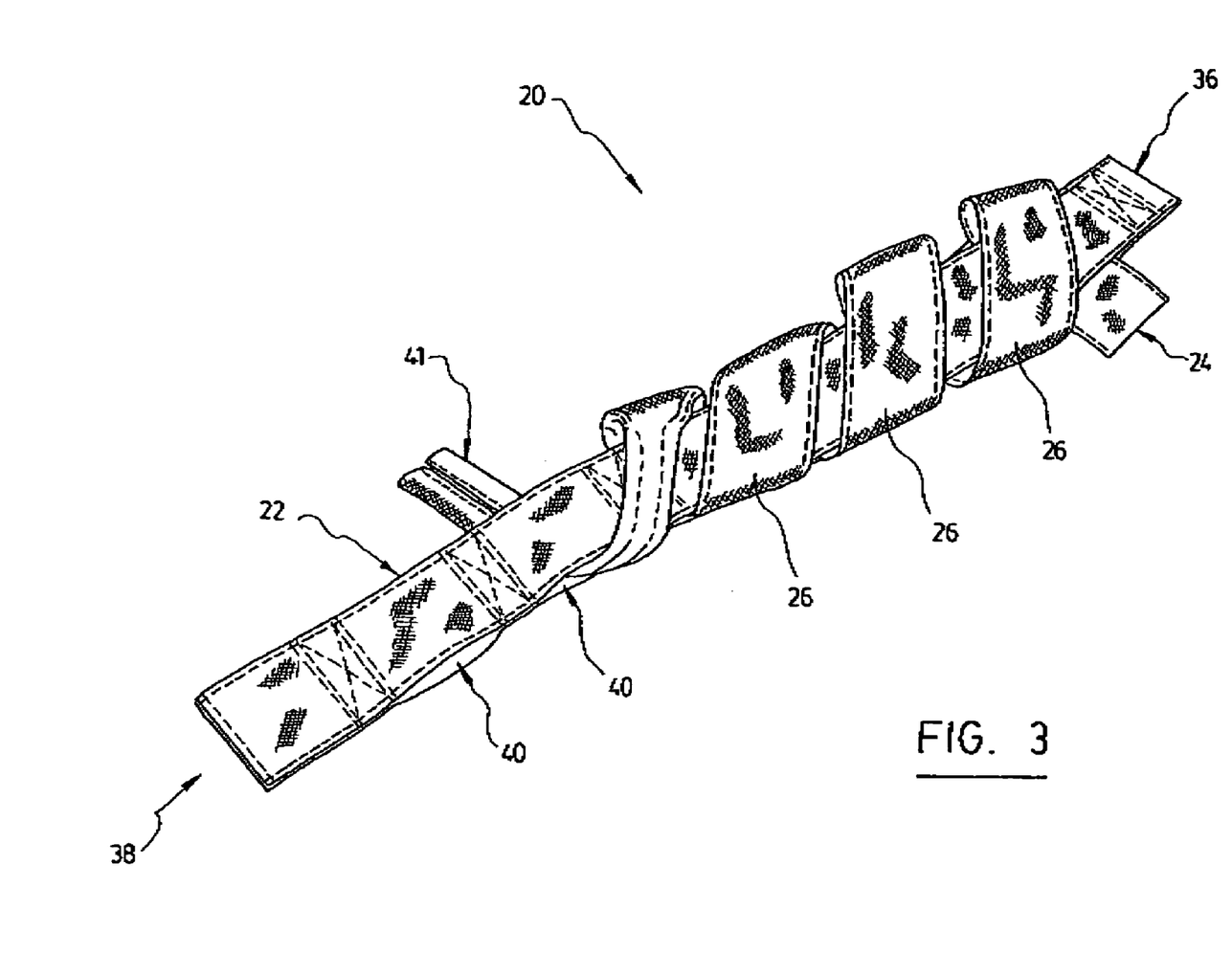
FIG. 3 is a perspective view of the adjustable spiral sleeve of FIG. 2, which has been spirally wound.

Referring to FIG. 2, the adjustable spiral sleeve (20) includes a support strip (22) that is aligned along the length of the lines and a wrapping strip (24) that is spirally wrapped around the lines, engaging the support strip (22) and forming a plurality of loop portions (26). More regarding the wrapping strip (24) will be discussed hereinbelow.

Figure 4:
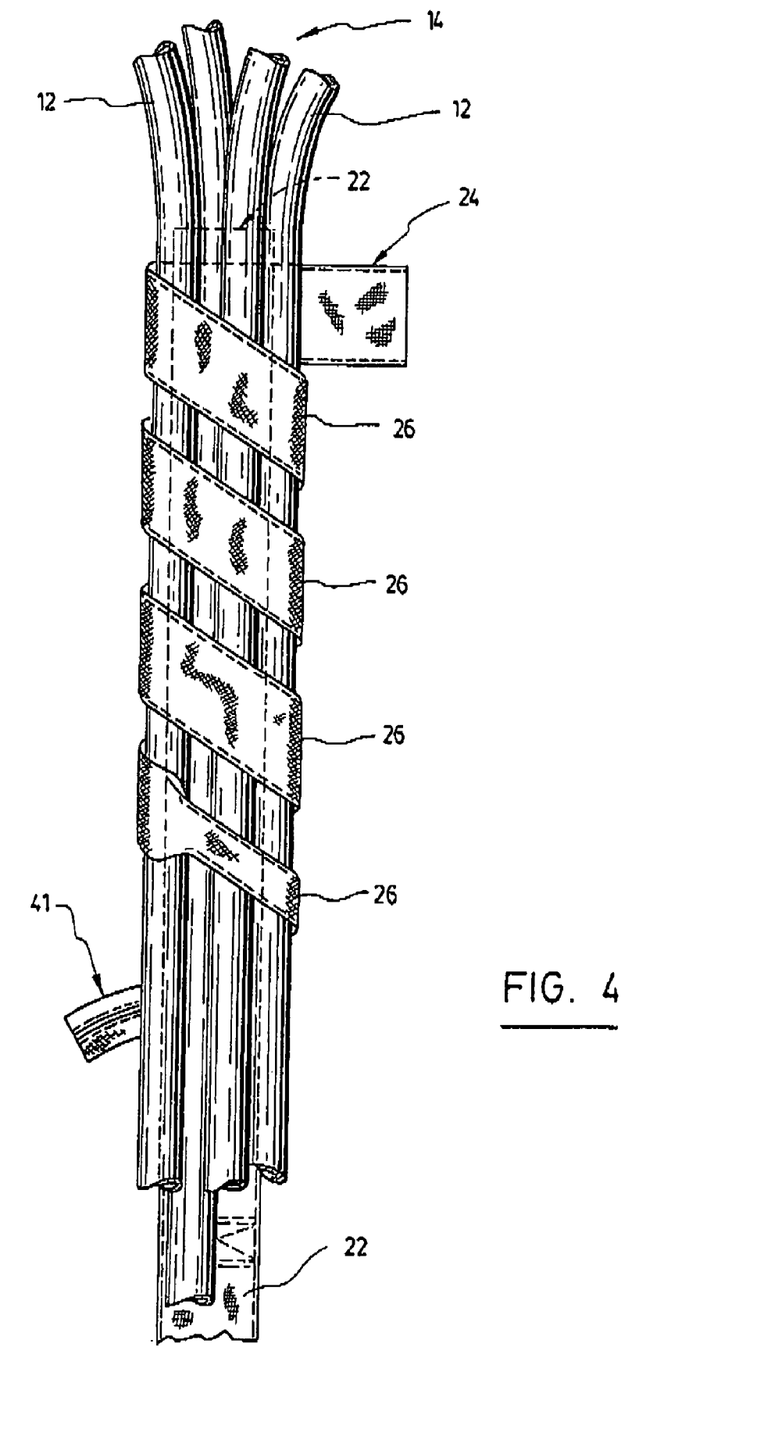
FIG. 4 is a top perspective view of the adjustable spiral sleeve regrouping a cluster of flexible lines according to a preferred embodiment of the present invention.

Referring to FIG. 4, the support strip (22) is partly shown in dotted lines. In use, the support strip (22) extends longitudinally along the line (12) or a cluster (14) of lines. By extending "longitudinally", it should be understood that the support strip (22) is aligned with the line. When used with flexible lines, the support strip (22) is preferably able to follow a variety of curvatures and bends that the cluster (14) of lines may take. The support strip (22) preferably has a straight, linear strip shape. Alternatively, the support strip may also have a variety of forms, such as a "T" or a "W" form, depending on the arrangement or intersection of the lines, as the case may be. Also, a number of support strips (22) may be used for one cluster of lines.

Referring back to FIG. 2, showing one embodiment of the present invention, the support strip (22) preferably takes the form of two superimposed flat layers (28, 30), which are attached at attachment points (32) distributed and spaced-apart at intervals along the length of the layers (28, 30). The attachment points (32) preferably include stitching (34) and/or gluing. Other attachment means known to a person skilled in the art may also be used, such as knotting, melt-bonding, clips, buttons and bolts, depending on the material of the layers and the intended application of the sleeve. Preferably, the attachment points include fasteners that would mitigate the wearing of the lines from frictional movement thereagainst. For example, clips, bolts, and buttons, when used, are preferably made of a non abrasive, non corrosive material such as plastic. However, for some applications, metallic attachment means may be used.

In a preferred aspect of the support strip (22), the longitudinal width of the stitching of each attachment point is about 1 inch. This enables a strong attachment between the superimposed layers (28, 30). More regarding this width will be discussed hereinbelow.

Still referring to FIG. 2, the support strip (22) has a first end (36) and a second end (38), and is provided with a plurality of connectors (40) spaced at intervals along the support strip (22) from the first end (36) to the second end (38). According to the preferred embodiment of FIG. 2, the connectors are openings (40) formed between the attachment points (32) of the two superimposed layers (28, 30). Preferably, each opening (40) is defined between the pair of superimposed layers (28, 30) and between two adjacent attachment points (32). The openings (40) are preferably regularly spaced along the support strip (22), but may also be spaced in a variety of different distributions, as desired. In this preferred embodiment, the wrapping strip (24) is inserted through the openings successively to wrap the lines.

Alternatively, the support strip (22) may include only one layer provided with holes or other shaped-openings (not shown) at intervals therealong. Thus the wrapping strip (24) may pass through the holes as it spirally wraps around and along the cluster of lines. Also, the holes provided in the support strip are preferably reinforced, albeit preferably with a material that does not unduly wear or damage the lines. This reinforcement may include extra stitching, a solid ring, or any other known to a skilled workman.

It should also be noted that the support strip (22) may take the form of a thin strip or other elongated support member, to which the wrapping strip (24) may adjustably connect to form adjustably-sized spiral loops (26). Of course, depending on the type of support strip (22), the appropriate connectors and type of wrapping strip should be selected.

Referring back to FIG. 4, the wrapping strip (24) is wrapped around the lines and is connectable with the connectors (40) of the support strip (22) at adjustable positions along the wrapping strip (24) to form a plurality of adjustably-sized loop portions (26) around the at least one line (12). Each loop portion (26) is defined between two connections to the support strip (22), preferably between two different connectors (4) which are preferably adjacent to each other, and is also defined between two adjustable positions of the wrapping strip (24). When a given adjustable position is adjusted so that the wrapping strip is connected to the same connector (40) at a different position along the length of the wrapping strip (24), there is a corresponding adjustment of the size of the loop portion (26).

It is also possible to wrap the wrapping strip (24) around the lines (12) several times while connecting the wrapping strip (24) to the same connector for each turn, so that a plurality of loop portions (26) are formed at a single connector (40). This may be desired when the wrapping strip is a thin strip that may be flexible and/or elastic, for reinforcing the sleeve at a particular place along the lines.

The wrapping strip (24) is provided with appropriate means for being adjustably connected to the support strip (22). In the preferred embodiment of FIG. 2, the wrapping strip (24) is simply insertable through the openings (40) of the support strip (22) to form a series of spiral loop portions (26), which are adjustably-sized. The wrapping strip (22) thus has the appropriate width for insertion through the openings (40). For example, a first loop portion (26a) may have a smaller diameter than a second loop portion (26b). The diameter of the loop portions (26) may be "adjusted", for example, by pulling on the end of the wrapping strip (24) to tighten the loop portion (26), or by pulling on the loop (26) itself to give it more slack. The adjustable spiral sleeve (20) may be adjusted around the cluster (14) of lines to give a tight or loose fit at specific locations along the length of the cluster (14). For example, when the cluster has a thick diameter, which is often the case at its extremities, the loop portions (26) may be adjusted to be enlarged to enable a proper fit. Thus, at each interval along the support strip (22), the wrapping strip (24) may be snugly wrapped around the line cluster (14). This adjustability is particularly advantageous at each end of the cluster, as at these extremities the lines often connect to the machine and the cluster tends to expand outwards.

Figure 5:
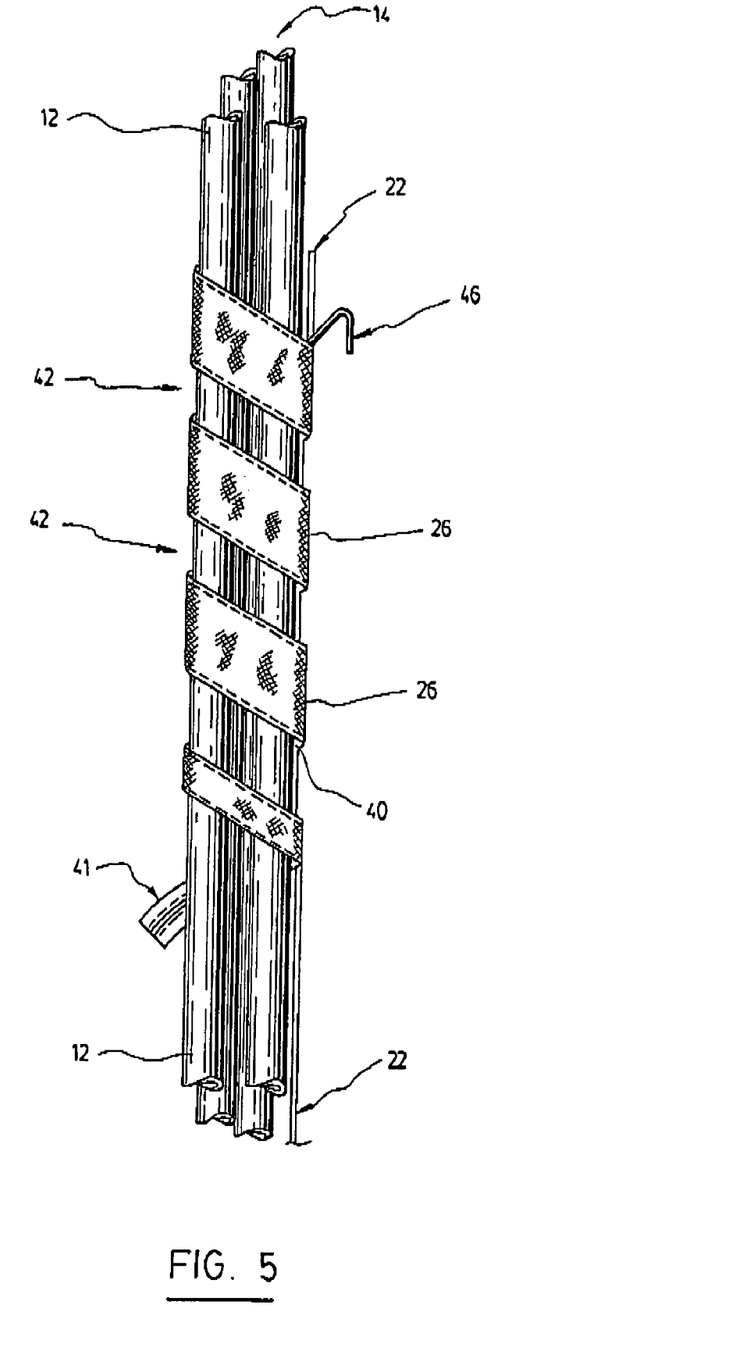
FIG. 5 is a side perspective view of the adjustable spiral sleeve regrouping a cluster of flexible lines, according to a preferred embodiment of the present invention.
Figure 6:
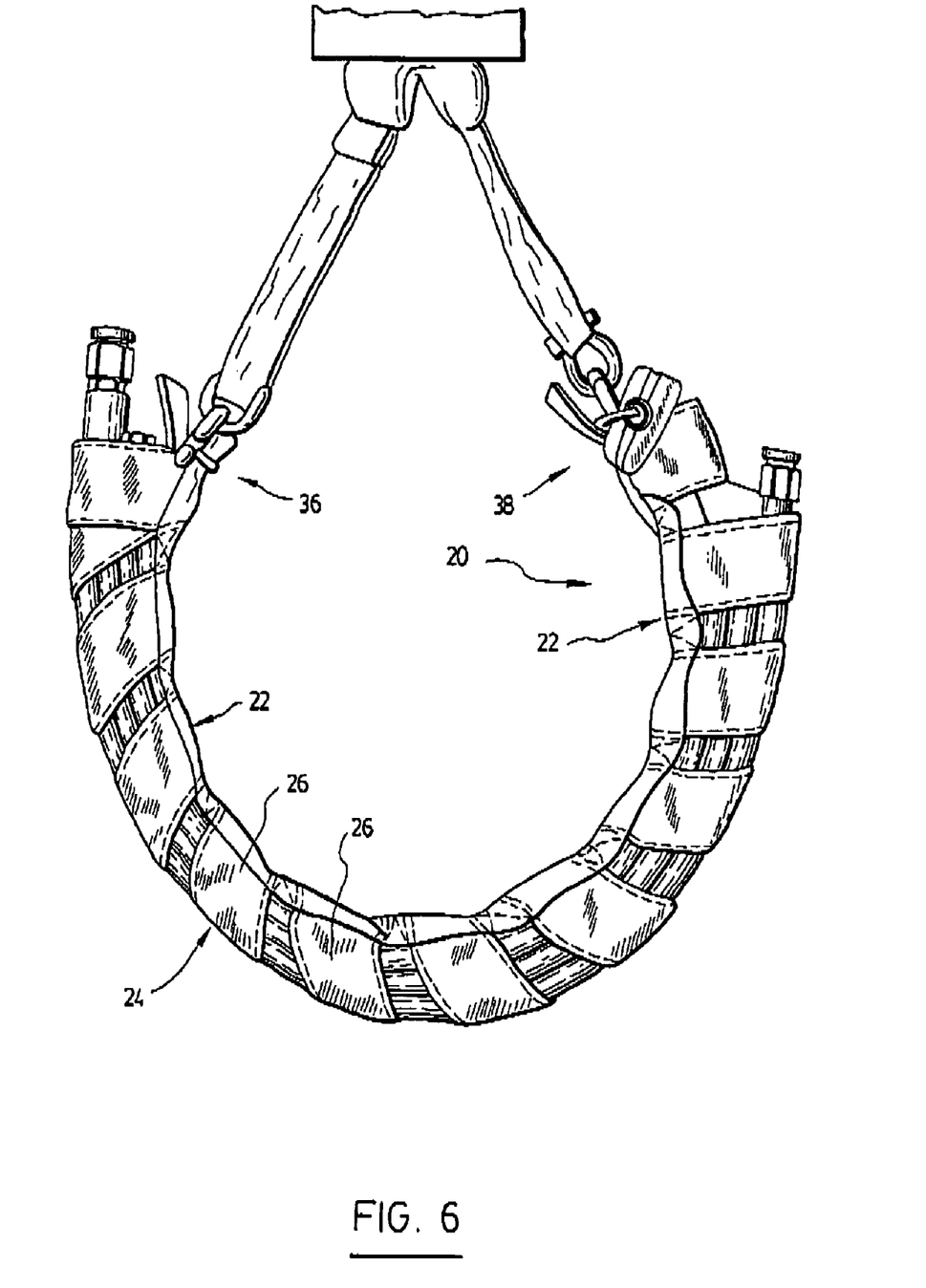
FIG. 6 is a perspective view of the adjustable spiral sleeve wrapped around a cluster of lines and connected to a support, according to a preferred embodiment of the present invention.

Referring to FIGS. 4-6, the wrapping strip (24) has been spirally wrapped through the openings (40) of the support strip (22) a number of times, and the loop portions (26) have been tightened around the cluster of lines.

It should be noted that the support strip (22) may have another type of connector (40) with which the wrapping strip (24) can adjustably engage. For instance, a number of fasteners (not shown) may be distributed and spaced-apart along the length of the support strip (22) and the wrapping strip (24) may have corresponding fasteners for mating with those of the support strip (22). Such fasteners should be secure when the wrapping strip (24) is wrapped around the lines, but should be adjustable by an operator to properly tighten the loop portions around the lines during installation. In the case where the support strip (22) and the wrapping strip (24) have a plurality of fasteners for mating and securing the sleeve around the lines, there should be a plurality of said fasteners distributed along the wrapping strip (24) so that it may be connected to the support strip (22) at adjustable positions along the length of the wrapping strip (24) to form the adjustably-sized loop portions (26).

The width of the support strip (22) may be predetermined to enable desired effects. Preferably, the support strip (22) has a width that is comparable to the diameter of the cluster of lines about which the adjustable spiral sleeve (20) is to be wrapped. The support strip (22) is thus able to cover one side of the cluster, while the wrapping strip (24) wrappingly covers around the circumference of the clusters. To give a more complete coverage, the support strip (22) may have a larger width to thereby radially wrap around at least part of the cluster, but it may also have a narrower width in certain circumstances. The wrapping strip may also have a variable width along its length.

Referring to FIGS. 2-5, the wrapping strip (24) preferably includes at least one tapered end (41) to facilitate inserting it through the openings (40). The tapered end (41) preferably consists of a laterally inward fold of the wrapping strip (22).

Referring now to FIGS. 4 and 5, the wrapping strip (24) is adjustably wrapped around the cluster (14) of lines (12) and along the length thereof, thereby covering the cluster (14) of lines. Particularly when each loop portion (26) of the wrapping strip (24) is defined between two adjacent connectors (40) and makes only one revolution of the cluster of lines, there is a gap (42) between each loop portion (26). The width of this gap (42) depends notably on the width of the attachment points (32). The gaps (42) may be preferred in certain applications, for instance to enable inspection of possible leaks or the arrangement of the lines and/or when simple regrouping of the cluster of lines is desired. The presence of a gap also minimises the amount of material necessary to cover the length of a line. Depending on the spacing of the openings (40), the type of attachment points (32) and the shape of the wrapping strip (24), the width of the gaps (42) may be modified. For example, a wrapping strip (24) with a greater width may be used to cover more of the lines (12).

In some other applications, it may be desirable to minimize or eliminate the gap (42) and there are various ways of doing so.

In the embodiment illustrated in FIGS. 2-6, the gap (42) may be minimized or eliminated by looping the wrapping strip (24) more than once between adjacent openings (40). In this case, which is not illustrated, each loop portion (26) of the wrapping strip (24) is doubly-looped and therefore covers more area of the lines while retaining its spiral form.

Figure 7:
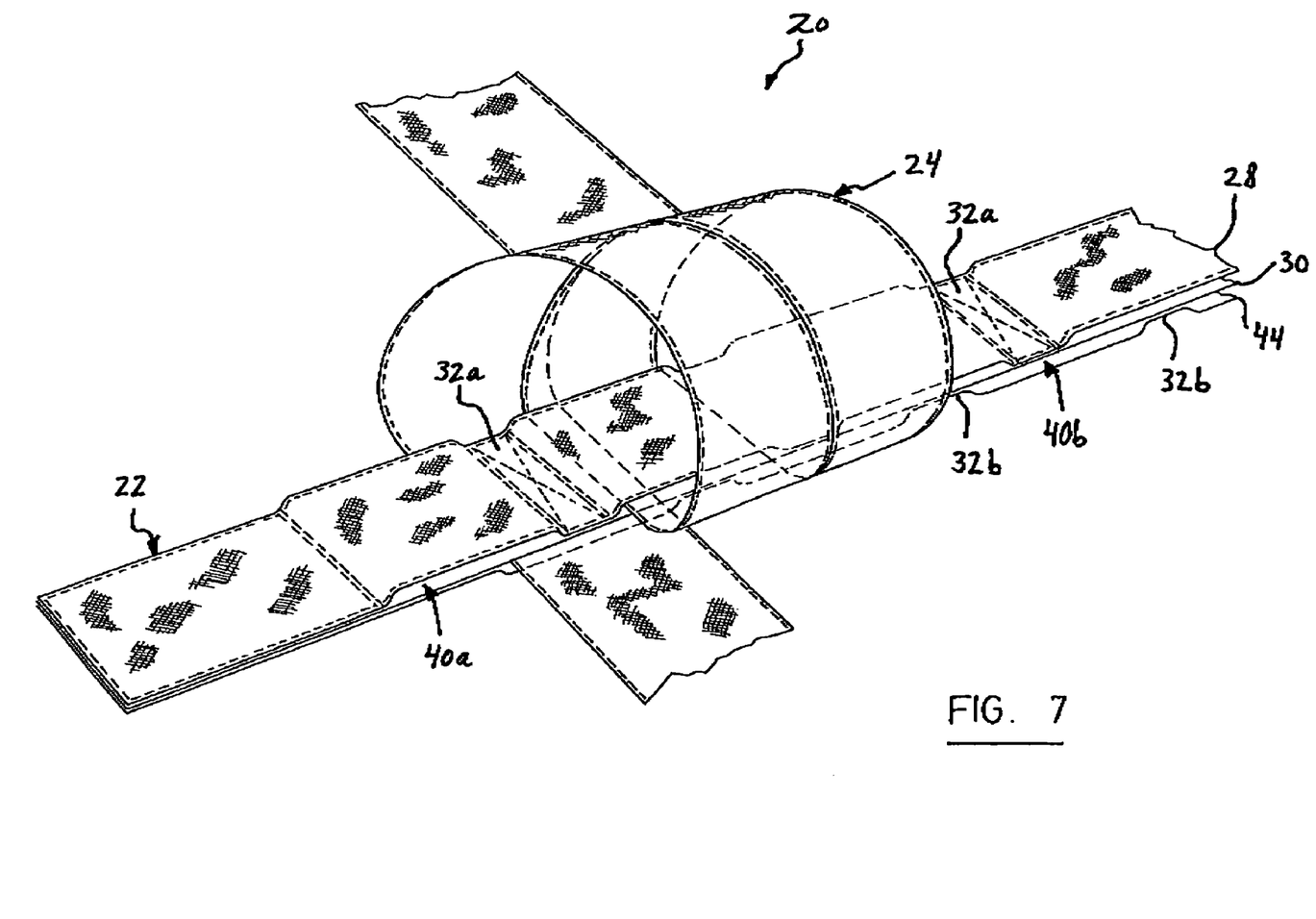
FIG. 7 is a perspective view of another embodiment of the adjustable spiral sleeve wrapped around a cluster of lines, wherein the support strip has two rows of offset openings.

In another embodiment of the spiral sleeve (20) illustrated in FIG. 7, the support strip (22) is modified in order to reduce or eliminate the gap (42). In this embodiment, the support strip includes three superimposed layers (28, 30, 44). The first (28) and the second (30) layers are attached to each other by a first set of longitudinally distributed spaced-apart attachment points (32a), in the same way as for the embodiment of FIGS. 2-6. In this embodiment, however, a third layer (44) is attached to one of the other layers at a second set of attachment points (32b), each of which is positioned in between two attachment points of the first set (32a). In this way, there are two offset rows of openings (40a, 40b) through which the wrapping strip (24) is insertable.

To install the FIG. 7 embodiment of the spiral sleeve (20), the support strip (22) is placed longitudinally alongside the line or lines and then the wrapping strip (24) is spirally wrapped around the line(s) by inserting it alternately through the openings (40) of the first and second (40a, 40b) rows of openings. Depending on the width of the openings (40), the offset of the first and second rows of openings and the width of the wrapping strip (24), the gap (42) may be reduced or eliminated.

In another alternative embodiment, the support strip (22) may be composed of a single layer provided with two offset rows of openings through which the wrapping strip (24) may be alternately inserted while being spirally wrapped around the lines. Preferably, as shown in FIGS. 2-7, one wrapping strip (24) is used with a corresponding support strip (22). However, when the arrangement of lines so calls for it, two or more wrapping strips (24) may be used with one support strip (22), or two or more support strips (22) may be used with one wrapping strip (24). Indeed, a plurality of support strips (22) may be used in combination with a plurality of wrapping strips (24) to regroup and protect lines in a variety of potential arrangements, depending on the working environment or the machine to be used.

The strips (22, 24) preferably present sufficient strength for the desired application. Preferably, the strength of the strips prevents breaking, tearing or elastic deformation when a significant amount of pressure or tension is applied thereto. For example, when used for protecting hydraulic lines in heavy hydraulic machinery, and the sleeve-covered line catches on an immovable object such as a tree, a rock or another piece of fixed equipment, the adjustable spiral sleeve (20) preferably has sufficient strength to stop or slow further movement of the machine, thereby preventing the hydraulic lines from being severely damaged.

Referring to FIG. 6, the adjustable spiral sleeve (20) is connected to a support (43). In practice, this support (43) is preferably part of the frame or substructure of the machine. In this Fig, the support strip (22) is connected to the support (43) at its two ends (36, 38) via another strap and carabiner. Of course, other fasteners known in the art may be used.

Preferably, when the sleeve (20) is used for covering and protecting hydraulic lines in heavy machinery, the support strip (22) and the wrapping strip (24) are removably fixed at their extremities to the frame of the machine. Thus, the spiral sleeve (20) is directly fixed to the machine (usually metallic parts such as a robotic arm, chassis, frame, etc.). As mentioned above, FIG. 6 shows an example of how the adjustable spiral sleeve may be connected to a support. When used in conjunction with a feller-buncher machine, for example, the support strip (22) may be connected to the hydraulic arm of the machine, thus hugging closely to the arm and holding the cluster of lines out of the way of certain dangers and snaggable objects (such as rocks, trees, etc.). The protective sleeve is preferably able to be attached at multiple points along the length of the cluster of hydraulic lines in order to better support the weight of the cluster, and to improve possibilities for moving the hydraulic lines.

Furthermore, the wrapping strip (24), when installed in conjunction with the support strip (22), is preferably fixed to the support strip (22) at its extremities. It may be so fixed using a variety of secure fixing means, including but not limited to knots, clips, carabiners, bolts, etc.

Referring back to FIG. 3, the openings (40) of the support strip (22) may be used to connect the support strip (22) to the superstructure of the machine via a hook (46) or another connection device, in order to guide and maintain the line cluster (14) in place. This may also be done using Velcro belts or collars, as well as using small chains, clips, clamps, carabiners or any other connection means known to a person skilled in the art. Alternatively, the line clusters (when they are flexible) may be allowed to hang freely from the machine, as the spiral sleeve (20) will protect the lines from inadvertent bumps, scrapes and wearing against a variety of objects during operation.

Materials

A variety of materials may be used to constitute the support strip (22) and the wrapping strip (24). Preferably, the strips (22, 24) are made of woven synthetic fibres. The fibres used may have a variety of microscopic forms and may be composed of a variety of polymers and/or copolymers, as would be known to a person skilled in the art. The synthetic fibres may be selected or engineered to give desirable characteristics to the strips of the adjustable spiral sleeve. The woven fabric is preferably non abrasive and presents a high strength capacity. The woven fabric may be composed of a base fibre material and reinforced with a variety of additional fibres to enhance certain desirable properties (such as strength, rigidity, elasticity, etc.), as the case may be. Polymer fibres with very low glass transition temperatures are preferable, especially for applications in cold environments. The fibres may also be extruded to have certain filament shapes that give rise to specific desirable properties once the fibres are woven together. Examples of synthetic fibres, particularly advantageous for weaving synthetic fabrics for the strips, are polyamides such as nylons, polyolefins, aramides, etc. Others may include polyesters, rayons, acetates, acrylics, olefins, PLAs, Aramids or Kevlar. It is particularly preferred that the strips be made of nylon fibers woven appropriately.

Natural fibres may also be used to produce woven fabrics appropriate for constituting the strips. Such fibres may be selected from plant and animal fibres known in the art. Cotton and hemps are examples of plant fibres. Depending on working and operating conditions, and of course material costs, a variety of different fibres and combinations thereof may be used. Examples of such materials include cotton, hemp, jute, ramie, sisal and/or kenaf.

Preferably, the material is supple, resistant and not very sensitive to temperature variation. The material is also preferably lightweight.

Installation Method

The installation of the adjustable spiral sleeve according to the present invention may be performed according to a variety of methods.

One such method includes the following steps:
c) placing a support strip longitudinally alongside the at least one line, the support strip including connectors being longitudinally distributed and spaced-apart therealong; and
d) spirally wrapping a wrapping strip around the at least one line and connecting the wrapping strip to the connectors of the support strip to form a plurality of adjustably-sized loop portions of the wrapping strip around the at least one line.

This above installation method is particularly preferred when employing the embodiment of the spiral sleeve (20) shown in FIGS. 2-6.

When employing the embodiment of the spiral sleeve (20) shown in FIG. 7, it is preferable to wrap the wrapping strip (24) spirally around the line(s) by inserting it alternately through the openings of the first and second (40a, 40b) rows of openings to form the loop portions (26) around the line(s).

Additional steps such as fastening the sleeve (20) to the machine chassis, connecting the two strips at their extremities and adjusting the spiral loops to a given tightness, may be easily envisioned and performed by a person skilled in the art. Furthermore, the wrapping strip (24) may be looped in a variety of looping patterns that would be known to a person skilled in the art.

The spiral sleeve (20) according to the illustrated embodiments presents a variety of advantages and features. For instance, installation of the sleeve may be performed before or after installation of the lines. The sleeve reduces the wearing of the lines from friction. A particular advantage of the present invention is that the tightness of the adjustable spiral sleeve (20) may be adjusted at each interval along the entire length of the line cluster, that is at each loop portion (26) of the wrapping strip (24). This enables improving the fit, covering, protection, as well as other advantages. Also, the unique configuration of the support strip (22) of the spiral sleeve enables the attachment of the protective wrapping strip (24) at multiple points, thus enabling a plurality of possibilities of positioning the lines. The sleeve has an excellent capacity to regroup the lines into clusters regardless of the cluster dimension, so that one spiral sleeve may adapt to many conditions. The sleeve also preferably avoids stretching and deformation of the strips. The protective sleeve preferably extends to the extremities of the lines to offer a superior resistance to forces on the cluster of the lines. The support strip enables the regular and ordered wrapping of the wrapping strip that is protective and supple, all around the cluster of lines. The protective sleeve, preferably for flexible hydraulic lines, also offers a variable diameter of wrapping enabling the reduction of the pressure on the ends of the cluster of lines. Thus, the adjustable spiral sleeve is adaptable to the diameter of the cluster.

Of course, numerous modifications could be made to the embodiments described hereinabove and illustrated in the Figs without departing from what has actually been invented.

The invention claimed is:

1. An adjustable spiral sleeve for wrapping around and regrouping a plurality of hydraulic lines, the sleeve comprising:
    a support strip for extending longitudinally alongside the plurality of lines, said support strip including a plurality of connectors longitudinally distributed and spaced-apart therealong; and
    a wrapping strip spirally wrapped around the plurality of lines and connected to the connectors of the support strip at adjustable positions along said wrapping strip to form a plurality of adjustably-sized loop portions of said wrapping strip around the plurality of lines.

2. The adjustable spiral sleeve of claim 1, wherein the connectors are openings and the wrapping strip is inserted through the openings.

3. The adjustable spiral sleeve of claim 2, wherein the support strip includes a pair of superimposed layers which are attached to each other at a plurality of longitudinally distributed and spaced-apart attachment points, each opening being defined between the pair of superimposed layers and between two adjacent attachment points.

4. The adjustable spiral sleeve of claim 3, wherein the attachment points are selected from the group consisting of stitching, gluing, clips, melt-bonding, knotting, buttons and bolts.

5. The adjustable spiral sleeve of claim 4, wherein the attachment points include stitching.

6. The adjustable spiral sleeve of claim 5, wherein the longitudinal width of the stitching is about 1 inch.

7. The adjustable spiral sleeve of claim 5, wherein the attachment points are regularly distributed along the support strip.

8. The adjustable spiral sleeve of claim 3, wherein the wrapping strip has a width that is less than the width of each of the openings.

9. The adjustable spiral sleeve of claim 8, wherein the wrapping strip includes at least one tapered end to facilitate inserting the wrapping strip through the openings.

10. The adjustable spiral sleeve of claim 9, wherein each of the at least one tapered end consists of a laterally inward fold of the wrapping strip.

11. The adjustable spiral sleeve of claim 1, wherein the support strip and the wrapping strip are both flat and elongated.

12. The adjustable spiral sleeve of claim 1, wherein the support strip and the wrapping strip are composed of a woven material.

13. The adjustable spiral sleeve of claim 12, wherein the woven material is a synthetic material and is nylon, polyester, rayon, acetate, acrylic, olefin, PLA, Aramids or Kevlar.

14. The adjustable spiral sleeve of claim 13, wherein the synthetic material is nylon.

15. The adjustable spiral sleeve of claim 12, wherein the woven material is a natural material and is cotton, hemp, jute, ramie, sisal or kenaf.

16. The adjustable spiral sleeve of claim 1, further comprising at least one fastener connected to the support strip for interconnecting the spiral sleeve to a support.

17. The adjustable spiral sleeve of claim 16, wherein the at least one fastener includes a plurality of fasteners arranged along the length of the support strip.

18. The adjustable spiral sleeve of claim 1, wherein the wrapping strip is configured such that each of the spiral loop portions of the wrapping strip is defined between two adjacent connectors of the support strip.

19. The adjustable spiral sleeve of claim 18, wherein the wrapping strip is configured such that each of the loop portions of the wrapping strip makes a single revolution around the plurality of lines.

20. The adjustable spiral sleeve of claim 2, wherein the support strip includes three superimposed layers, a first and a second one of said layers being attached to each other by a first set of longitudinally distributed spaced-apart attachment points, and a third one of said layers being attached to one of the first and second layers at a second set of attachment points longitudinally offset from the attachment points of the first set, to defined two rows of offset openings.

21. A method of wrapping at least one line, comprising the steps of:
    a) placing a support strip longitudinally alongside the at least one line, said support strip comprising connectors being longitudinally distributed and spaced-apart therealong;
    b) spirally wrapping a wrapping strip around the at least one line and connecting said wrapping strip to the connectors of the support strip to form a plurality of adjustably-sized loop portions of the wrapping strips around the at least one line.

22. The method of claim 21, wherein the connectors of the support strip are openings, and in said step b) the wrapping strip is successively inserted through the openings.

23. The method of claim 22, wherein the wrapping strip is successively connected to each of the openings of the support strip.

24. The method of claim 23, wherein in said step b) each loop portion is tightened around the at least one line before a subsequent loop portion is formed.

25. The method of claim 24, further comprising a step c) of fastening the support strip to a machine.

26. The method of claim 21, wherein the at least one line is a plurality of lines which are grouped together.

27. The method of claim 21, wherein the support strip and the wrapping strip are two distinct and separate strips.

28. The adjustable spiral sleeve of claim 1, wherein the support strip and the wrapping strip are two distinct and separate strips.

* * * * *